(12) United States Patent
Conta et al.

(10) Patent No.: US 6,851,791 B2
(45) Date of Patent: Feb. 8, 2005

(54) POLYCHROMATIC PRINTHEAD

(75) Inventors: Renato Conta, Ivrea (IT); Alessandro Scardovi, Ivrea (IT); Angelo Menegatti, Banchette (IT)

(73) Assignee: Olivetti Tecnost S.p.A., Ivrea (IT)

( * ) Notice: Subject to any disclaimer, the term of this patent is extended or adjusted under 35 U.S.C. 154(b) by 59 days.

(21) Appl. No.: 10/203,299

(22) PCT Filed: Feb. 13, 2001

(86) PCT No.: PCT/IT01/00061
§ 371 (c)(1),
(2), (4) Date: Aug. 9, 2002

(87) PCT Pub. No.: WO01/58692
PCT Pub. Date: Aug. 16, 2001

(65) Prior Publication Data
US 2003/0011657 A1 Jan. 16, 2003

(30) Foreign Application Priority Data
Feb. 14, 2000 (IT) .................................... TO2000A0140

(51) Int. Cl.[7] .................. B41J 2/21; B41J 2/05
(52) U.S. Cl. .......................................... 347/43; 347/58
(58) Field of Search .................. 347/43, 58, 59, 347/9, 12, 57, 50, 40

(56) References Cited
U.S. PATENT DOCUMENTS
4,864,328 A 9/1989 Fischbeck
5,455,610 A 10/1995 Harrington
6,318,846 B1 * 11/2001 Saul ........................... 347/57

FOREIGN PATENT DOCUMENTS
DE 34 12 531 A 10/1985
DE 196 06 854 A 9/1996
EP 0 739 736 A 10/1996

OTHER PUBLICATIONS
Patent Abstracts of Japan, vol. 1998, No. 13, Nov. 30, 1998 & JP 10 202876 A (Seiko Epson Corp), Aug. 4, 1998 abstract.

* cited by examiner

Primary Examiner—Thinh Nguyen
(74) Attorney, Agent, or Firm—Banner & Witcoff, Ltd.

(57) ABSTRACT

This invention relates to a printhead in which a plurality of resistors are selectively activated by an external control circuit to produce the ejection of droplets of ink through nozzles located in correspondence with the resistors. Selection and activation are performed according to a matrix having a plurality of vertical lines corresponding to the number of resistors per group of nozzles and a plurality of horizontal lines corresponding to the number of groups of nozzles in the head. The groups of nozzles in the polychromatic head comprise real nozzles and fictitious nozzles, as a result of which the groups of nozzles have a regular layout, and are uniformly distributed and equivalent to the corresponding layout of a monochromatic head. With this solution, polychromatic heads having the same number and the same disposition of contacts with the external circuit and the same height as a monochromatic head can be manufactured simply.

6 Claims, 3 Drawing Sheets

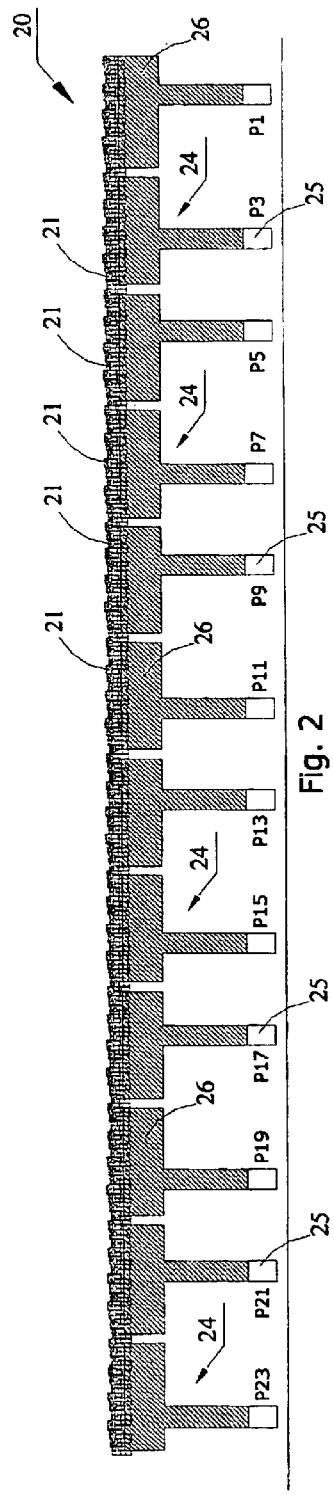
Fig. 2
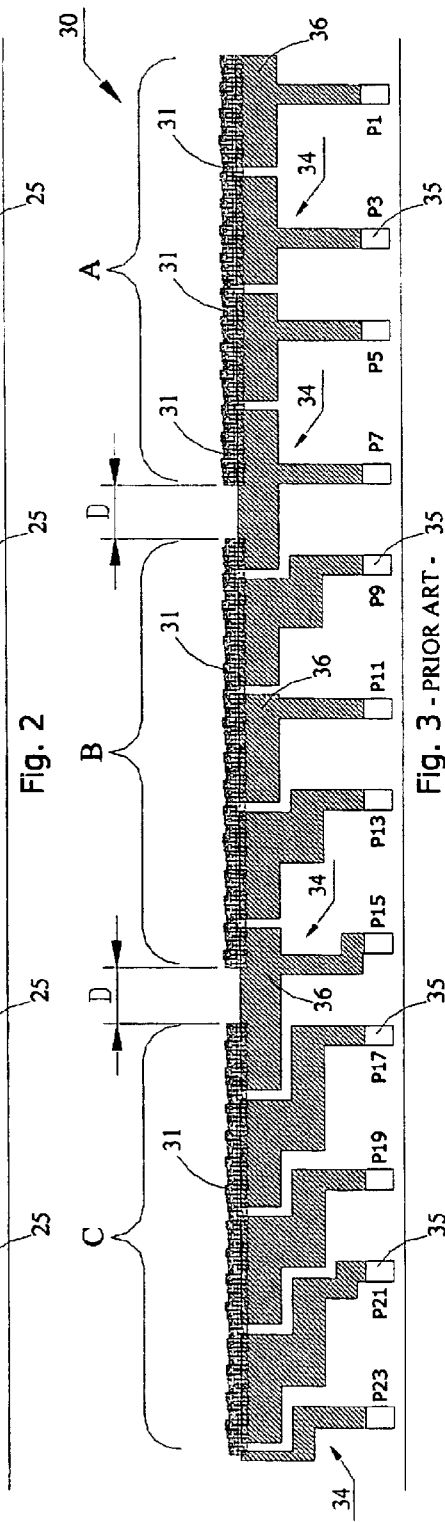
Fig. 3 - PRIOR ART -
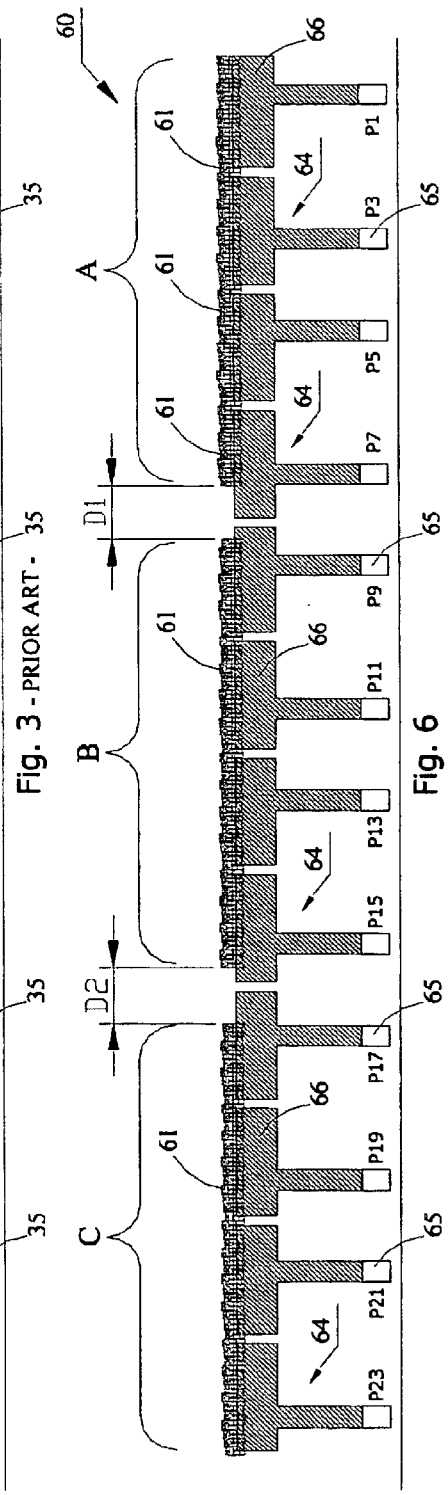
Fig. 6

Fig. 4

| ODD PRIMITIVES = P | | | | | | | | | | | | | | |
|---|---|---|---|---|---|---|---|---|---|---|---|---|---|---|
| 1 | 19 | 13 | 7 | 1 | 21 | 15 | 9 | 3 | 23 | 17 | 11 | 5 | 25 | N |
| 3 | 45 | 39 | 33 | 27 | 47 | 41 | 35 | 29 | 49 | 43 | 37 | 31 | 51 | O |
| 5 | 71 | 65 | 59 | 53 | 73 | 67 | 61 | 55 | 75 | 69 | 63 | 57 | 77 | Z |
| 7 | 97 | 91 | 85 | 79 | 99 | 93 | 87 | 81 | 101 | 95 | 89 | 83 | 103 | Z |
| 9 | 123 | 117 | 111 | 105 | 125 | 119 | 113 | 107 | 127 | 121 | 115 | 109 | 129 | L |
| 11 | 149 | 143 | 137 | 131 | 151 | 145 | 139 | 133 | 153 | 147 | 141 | 135 | 155 | E |
| 13 | 175 | 169 | 163 | 157 | 177 | 171 | 165 | 159 | 179 | 173 | 167 | 161 | 181 | S |
| 15 | 201 | 195 | 189 | 183 | 203 | 197 | 191 | 185 | 205 | 199 | 193 | 187 | 207 | |
| 17 | 227 | 221 | 215 | 209 | 229 | 223 | 217 | 211 | 231 | 225 | 219 | 213 | 233 | |
| 19 | 253 | 247 | 241 | 235 | 255 | 249 | 243 | 237 | 257 | 251 | 245 | 239 | 259 | |
| 21 | 279 | 273 | 267 | 261 | 281 | 275 | 269 | 263 | 283 | 277 | 271 | 265 | 285 | |
| 23 | 305 | 299 | 293 | 287 | 307 | 301 | 295 | 289 | 309 | 303 | 297 | 291 | 311 | |
| | 1 | 2 | 3 | 4 | 5 | 6 | 7 | 8 | 9 | 10 | 11 | 12 | 13 | |
| | ADDRESSES = I | | | | | | | | | | | | | |

Fig. 5
- PRIOR ART -

| ODD PRIMITIVES = P | | | | | | | | | | | | | | |
|---|---|---|---|---|---|---|---|---|---|---|---|---|---|---|
| 1 | 19 | 13 | 7 | 1 | 21 | 15 | 9 | 3 | 23 | 17 | 11 | 5 | 25 | N |
| 3 | 45 | 39 | 33 | 27 | 47 | 41 | 35 | 29 | 49 | 43 | 37 | 31 | 51 | O |
| 5 | 71 | 65 | 59 | 53 | 73 | 67 | 61 | 55 | 75 | 69 | 63 | 57 | 77 | Z |
| 7 | 97 | 91 | 85 | 79 | 99 | 93 | 87 | 81 | 101 | 95 | 89 | 83 | 103 | Z |
| 9 | 123 | 117 | 111 | 105 | 125 | 119 | 113 | 107 | 127 | 121 | 115 | 109 | 129 | L |
| 11 | 149 | 143 | 137 | 131 | 151 | 145 | 139 | 133 | 153 | 147 | 141 | 135 | 155 | E |
| 13 | 175 | 169 | 163 | 157 | 177 | 171 | 165 | 159 | 179 | 173 | 167 | 161 | 181 | S |
| 15 | 201 | 195 | 189 | 183 | 203 | 197 | 191 | 185 | 205 | 199 | 193 | 187 | 207 | |
| 17 | 227 | 221 | 215 | 209 | 229 | 223 | 217 | 211 | 231 | 225 | 219 | 213 | 233 | |
| 19 | 253 | 247 | 241 | 235 | 255 | 249 | 243 | 237 | 257 | 251 | 245 | 239 | 259 | |
| 21 | 279 | 273 | 267 | 261 | 281 | 275 | 269 | 263 | 283 | 277 | 271 | 265 | 285 | |
| 23 | | | | 287 | | | | | | | | | | |
| | 1 | 2 | 3 | 4 | 5 | 6 | 7 | 8 | 9 | 10 | 11 | 12 | 13 | |
| | ADDRESSES = I | | | | | | | | | | | | | |

POLYCHROMATIC PRINTHEAD

This is a U.S. National Phase Application Under 35 USC 371 and applicants herewith claim the benefit of priority of PCT/IT01/00061 filed Feb. 13, 2001, which was published Under PCT Article 21(2) in English and Application No. T02000A000140 filed in Italy on Feb. 14, 2000.

TECHNICAL FIELD

This invention relates to a polychromatic printhead comprising a plurality of terminals suitable for being connected to an external control circuit, a plurality of bars of ink ejection means suitable for being selectively controlled by the external control circuit, and a plurality of connections, each suitable for connecting one of the terminals to one of the bars.

In particular, this invention relates to a polychromatic ink jet printhead.

BACKGROUND ART

Monochromatic and polychromatic ink jet printheads of the IDH type (Integrated Drive Head) are known consisting of an integrated circuit in which a plurality of thermal resistances or resistors are selectively activated by an external control circuit which transmits data or control signals to the head in order to produce the ejection of droplets of ink through nozzles located in correspondence with these resistors.

The wiring diagram of the known heads 10 (FIG. 1), both monochromatic and polychromatic, comprises, arranged in two columns, a plurality of activation groups or primitives 14 each comprising a plurality of resistors 11 and corresponding power transistors 12 (addresses I).

As is disclosed in U.S. Pat. No. 4,864,328, each primitive 14 is selected and activated by means of contacts $P_{J=1+M}$ (Primitives Select) and each transistor 12 is selected and activated by means of contacts $A_{I=1+N}$ (Address Line Select).

Operation of the known monochromatic and polychromatic heads consists of the following steps for each column:

activating for a given time a first address I, for example the address I=1, through the contacts $A_1$;

electrically feeding a given configuration of primitives with predetermined current pulses and through the contacts $P_{J=1+M}$;

activating in sequence a second address I;

electrically feeding a second given configuration of primitives with predetermined current pulses and through the contacts $P_{J=1+M}$;

and so on in successive steps, until activation of the N addresses I is completed.

Whereas the wiring diagrams of the monochromatic and polychromatic printheads 10 are substantially the same, layout of the monochromatic heads 20 (FIG. 2), especially that of the activation groups or primitives 24, differs significantly in the known art from that of the polychromatic heads 30 (FIG. 3).

For example, the layout of a monochromatic head 20 (FIG. 2) of 312 nozzles comprises two columns of primitives, respectively a column of 12 odd-numbered primitives 24 and an even-numbered column, wherein each primitive 24 comprises 13 resistors 21 and corresponding nozzles:

$$312\,\text{nozzles} = 13 * 12 * 2$$

wherein:

13=number of addresses I that may be selected per activation group or primitive;

12=number of primitives 24 per column; and

2=number of columns in the head.

In particular the layout of the primitives 24 of each column, for example the odd-numbered column, comprises 12 terminals or contacts 25 suitable for being connected to an external circuit and 12 common bars 26 of resistors 21 connected to the respective terminals with linear connections, parallel to one another and uniformly distributed.

The corresponding layout of the primitives 34 (FIG. 3) of a compatible polychromatic head 30, i.e. having the same height, same number and disposition of contacts as the monochromatic head 20 (FIG. 2), comprises, for a like number of columns, 288 nozzles arranged in three colour blocks, respectively block A, B and C (FIG. 3), separated from one another by gaps D needed to physically separate the different colour blocks A, B, C.

Document U.S. Pat. No. 5,455,610 discloses a thermal ink-jet printer in which two parallel linear arrays of ejectors are subdivided into sections, the ejectors in each section being adapted to emit ink of a preselected color.

For the reasons of compatibility mentioned above, in the known art the layout of the primitives 34 of each column, for example that of the odd-numbered column, comprises 12 terminals or contacts 35 suitable for being connected to an external circuit and 12 common bars 36 of resistors 31 connected to the respective terminals.

In this case, however, according to the known art the common bars 36 are different from one another as some are connected to two adjacent colour blocks with the result that the layout of the connections between the terminals 35 and the common bars 36 is non-homogeneous, non-uniform, and of different length depending on changes to the primitive.

In addition, as the number of nozzles in the compatible polychromatic heads is less than that of the corresponding monochromatic heads, due to the gaps D, the higher order primitives are connected to a limited number of resistors.

In the example of FIG. 2:

$$288\,\text{nozzles} = (13*11*2) + (13*1*2)$$

for like addresses, primitives and columns, the higher order primitives are connected to a single resistor 31.

In short, in the known art the layout of the primitives 34 of a polychromatic head 30 is so complex and difficult to produce that in some cases the integrated circuit that constitutes the head must include a conducting layer (metal) in addition to those required for a monochromatic head in order to be able to make the interconnections.

Besides, in cases of particularly difficult layouts, the terminals corresponding to the higher order primitives of the head are not connected to the resistors with the result that one of the colour blocks, for instance the colour block C, comprises a lesser number of resistors and therefore of nozzles than the other colour blocks.

Disclosure of the Invention

The object of this invention is to produce a polychromatic printhead wherein the overall layout, particularly that of the primitives, has the same characteristics of ease and simplicity of manufacturing as in the monochromatic heads while maintaining the characteristics of compatibility, such as same number and disposition of contacts with the external circuit and same height.

This object is achieved by the polychromatic printhead wherein the connections are arranged according to a regular layout equivalent to the layout of the corresponding connections in a monochromatic printhead.

According to another characteristic of this invention, the solution identified is optimal for polychromatic printheads having a number of primitives that can be divided by the number of colour blocks envisaged.

This and other characteristics of this invention will become clear from the description that follows of a preferred embodiment and with reference to the accompanying drawings.

LIST OF FIGURES

FIG. 2 represents the layout of a column of primitives of a monochromatic head;

FIG. 3 represents the layout of a column of primitives of a polychromatic head according to the known art;

FIG. 4 represents the table of excitation of a column of primitives of a monochromatic head;

FIG. 5 represents the table of excitation of a column of primitives of a polychromatic head according to the known art;

FIG. 6 represents the layout of a column of primitives of a polychromatic head according to the invention.

DESCRIPTION OF THE PREFERRED EMBODIMENT

Figures 1, 7:
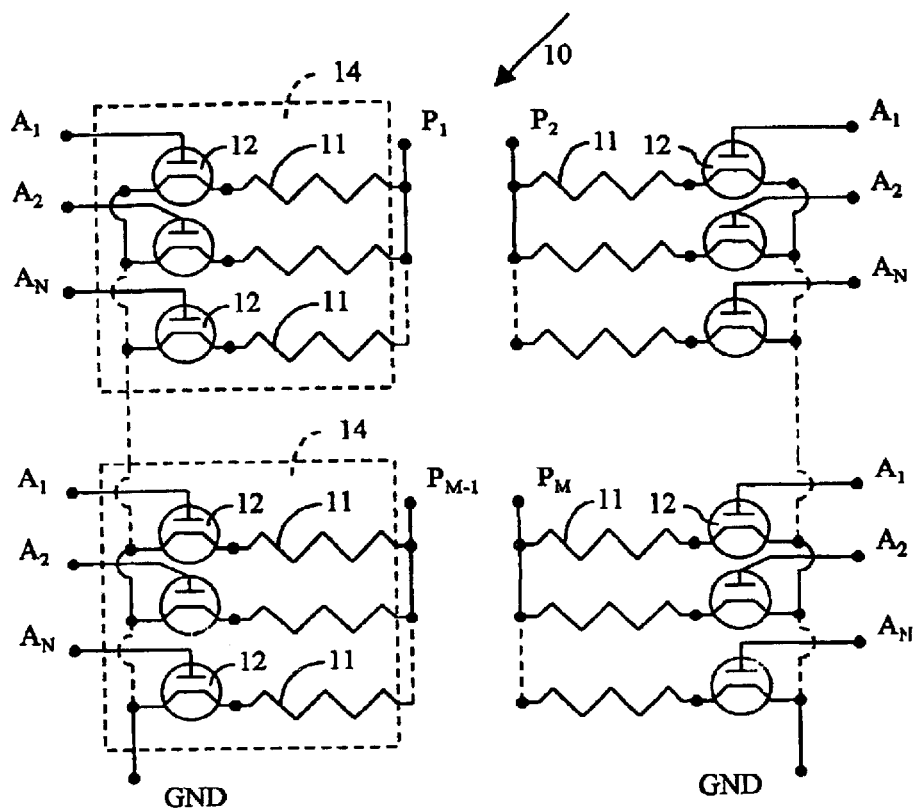
FIG. 1 Represents a wiring diagram of a printhead.
FIG. 7 represents the table of excitation of a column of primitives of the head of FIG. 6.

The excitation table or grid (FIG. 4) of the odd primitives (first column of nozzles) of a monochromatic printhead 20 (FIG. 2) of known type, for example with 312 nozzles, comprises 13 vertical lines (FIG. 4) or addresses and 12 horizontal lines or primitives.

Assuming, for simplicity's sake, that the odd primitives consist of nozzles with an ascending odd-numbering scheme, the table of FIG. 4 shows precisely an example of the sequence in which the ink ejection data are transmitted to the various nozzles by the control circuit.

For example the excitation sequence is as follows:

a first address is activated by an excitation signal for a predetermined time, for example the address corresponding to the nozzles 19, 45, 71, 97, 123, 149, 175, 201, 227, 253, 279, 305;

a first configuration of odd primitives is electrically supplied in selective fashion, for example all the primitives in cases of ejection of ink from all the nozzles;

a second address is activated for a predetermined time, for example the address corresponding to the nozzles 13, 39, 65, 91, 117, 143, 169, 195, 221, 247, 273, 299;

a second configuration of odd primitives is electrically supplied in selective fashion, for example all the primitives in cases of ejection of ink from all the nozzles;

and so on, until completion of all the columns or addresses.

Naturally there is an equivalent table for the excitation of the even primitives corresponding to a second column of nozzles of the printhead; this table is not depicted as it may reconstructed quite simply by anyone acquainted with the sector art on the basis of the table in FIG. 4.

The corresponding table of excitation or grid (FIG. 5) of the odd primitives (first column of nozzles) of the compatible polychromatic printhead 30 (FIG. 3), for example with 288 nozzles, again comprises 13 vertical lines (FIG. 5) or addresses and 12 horizontal lines or primitives.

In this case however, the first 11 primitives comprise 13 nozzles, the twelfth primitive, for example primitive 23, comprises a single nozzle, and furthermore the primitives 7 and 15 comprise nozzles belonging to two adjacent colour blocks, depicted in the table in FIG. 5 with the numerals of the nozzles in a different background.

Accordingly:

the excitation sequence is the same as that described for the monochromatic head only for the first 11 primitives and the primitives 7 and 15 concern pairs of adjacent colours;

the numbering of the nozzles is consistent with the number of nozzles actually on the head;

the succession of data and the excitation of the nozzles is sequential;

the layout of the primitives is non-homogeneous and non-uniform to allow for the gaps D.

With reference to FIG. 6 a polychromatic printhead (head) 60, according to the invention, comprises a plurality of resistors 61 and associated nozzles, of known type, distributed between numerous colour blocks, for example between three colour blocks, respectively A, B, C, separated by gaps D, respectively D1 and D2, of known type, corresponding to a predetermined number of missing nozzles.

The head 60 also comprises a plurality of primitives 64 each comprising a terminal 65, of known type, and a respective common bar 66 connected, in a known way, to a group of resistors 61.

The terminals 65 of the primitives 64 are connected to the respective common bars 66 with connections of primitives having a layout equivalent to that of the monochromatic head 20 (FIG. 2), as is described in detail below in a preferred embodiment.

The colour head 60 of 288 nozzles, according to the example, compatible with the monochromatic head 20 (FIG. 2 and FIG. 6) of 312 nozzles, comprises two columns of 144 nozzles in which each column, in turn, comprises three colour blocks, respectively A, B, C of 48 resistors 61 and corresponding nozzles and two gaps D1 and D2 of 6 missing nozzles or fictitious nozzles.

In fact:

$$48*3+6*2=156$$

where 156 is the number of nozzles of a column of the monochromatic head 20 with which the colour head 60 of the example is compatible.

The common bars 66 of the odd primitives 64 with numbering P1, P3, P5, P11, P13 and P19, P21 and P23 have 13 resistors and corresponding nozzles, equivalent to the monochromatic head 20.

The primitives with numbering P7 (FIG. 6) and P17 have 9 resistors 61 and the primitives P9 and P15 have 11 resistors 61.

Thanks to this distribution of the resistors 61, the common bars 66 are of constant and uniform length and are equivalent to the common bars 26 (FIG. 2) of the monochromatic head 20.

Furthermore, the connections of primitives are also equivalent to those of the monochromatic head 20 as the terminals 65 (FIG. 6) are located on the head, for reasons of compatibility, in the same position as the terminals 25 (FIG. 2) of the monochromatic head 20 and the common bars 66 (FIG. 6) are equivalent to those of the monochromatic head 20 (FIG. 2).

Operation of the head 60 (FIG. 6), i.e. the sequence of ejection of the ink from the various nozzles is illustrated in the table of FIG. 7 for the column of odd primitives and corresponding, odd-numbered nozzles.

The numbering of the nozzles corresponds exactly to that (FIG. 4) of the monochromatic head, with the sole difference that some nozzles, in particular those underlined in the table of FIG. 7, i.e. the nozzles 97, 99, 101, 103, 105, 107, 205, 207, 209, 211, 213, 215, even though included in the table, do not correspond to real resistors and nozzles, corresponding instead to the missing nozzles of the gaps D1 and D2 (FIG. 6 and FIG. 7).

The excitation sequence of the head 60 is identical to that already described for the monochromatic head, with the sole difference that some nozzles, being fictitious nozzles, will never be excited, whatever the configuration of primitives powered.

From the logical viewpoint, the control circuit of the head 60 may be compared to that of the monochromatic head and presents architectural differences with respect to the control circuit of the known polychromatic heads.

On the basis of the example of embodiment described, therefore:

- the sequence of excitation of the head 60 is identical to that described for the monochromatic heads;
- the numbering of the nozzles is not consistent with the number of nozzles actually present on the head and corresponds to that of the monochromatic heads;
- the succession of the data and the excitation of the nozzles is not sequential in that for some addresses some primitives do not have nozzles, in other words the sequence of excitation comprises data both for the real nozzles and for the fictitious ones and the data for the fictitious nozzles are fictitious data, i.e. data specially inserted by the control circuit in correspondence with the fictitious nozzles in order to complete the vertical lines of the table in FIG. 7;
- the layout of the primitives is uniformly distributed on the head and corresponds to the layout of the primitives of a monochromatic head.

From the example described, it is apparent that the layout of the primitives of the polychromatic heads according to the invention does not change when the gaps D and the corresponding number of missing nozzles change.

In the example the number of primitives of a column may be divided by the number of colour blocks.

This condition is optimal in that it permits both to group the primitives by colour block and not to have primitives with nozzles of adjacent colours. However, even where the number of primitives cannot be divided by the number of colour blocks, the solution described remains validly applicable.

In the example, a head with three colour blocks and two columns is described, but it is obvious that the colour blocks and the columns may be of a different number without altering the characteristics of the solution described.

Moreover, the solution described clearly make it possible to use, both for the polychromatic and monochromatic heads irrespectively, certain production fixtures or jigs, such as for example the jigs for the production of the common bars and for the connections of primitive.

What is claimed is:

1. Polychromatic printhead comprising a plurality of terminals suitable for being connected to an external control circuit;

a plurality of bars of ink ejection means suitable for being selectively controlled by said external control circuit;

a plurality of connections, each connecting one of said terminals to one of said bars;

wherein said connections are disposed according to a regular layout corresponding to the layout of said connections in a monochromatic printhead wherein said connections are substantially parallel to one another and uniformly distributed.

2. Printhead according to claim 1 wherein said bars are grouped so as to form a predetermined number of blocks each having ink ejection means of a predetermined colour.

3. Printhead according to claim 2 wherein the number of said terminals is a integer multiple of said predetermined number of blocks.

4. Printhead according to claim 2 or 3 wherein said blocks are separated by a predetermined gap corresponding to the predetermined number of missing or fictitious ejection means and wherein at least one of the bars adjacent to said gaps, comprises a lower number of ejection means than that of the bars not adjacent to said gaps.

5. Method for controlling the ejection of ink in a polychromatic printhead according to one of claims 1 to 3, having a plurality of activation groups; and a plurality of ink ejection elements associated with each of said activation groups; the method comprising the steps of:

a) selecting and activating for a predetermined time an element of said groups;

b) selecting and activating during said predetermined time a predetermined configuration of said activation groups; and of repeating said steps a) and b) until the completion of said plurality of elements; wherein said plurality of elements comprises real and fictitious ink ejection elements; and wherein said predetermined configuration corresponds to the configuration of a monochromatic printhead and comprises real data associated with said real elements and fictitious data associated with said fictitious elements.

6. Method for controlling the ejection of ink in a polychromatic printhead having a plurality of activation groups; and a plurality of ink ejection elements associated with each of said activation groups, the method comprising the steps of:

a) selecting and activating for a predetermined time an ink ejection element of said groups;

b) selecting and activating during said predetermined time a predetermined configuration of said activation groups; and repeating said steps a) and b) until the completion of said plurality of ink ejection elements;

wherein said plurality of ink ejection elements comprises real and fictitious ink ejection elements; and wherein said predetermined configuration of said activation groups corresponds to a configuration of a monochromatic printhead wherein a layout of said activation groups is uniformly distributed on said polychromatic printhead and comprises real data associated with said real ink ejection elements and fictitious data associated with said fictitious ink ejection elements.

* * * * *